(12) United States Patent
Hiraiwa et al.

(10) Patent No.: US 10,109,866 B2
(45) Date of Patent: Oct. 23, 2018

(54) GAS DECOMPOSITION DEVICE AND POWER GENERATION DEVICE

(71) Applicant: SUMITOMO ELECTRIC INDUSTRIES, LTD., Osaka-shi, Osaka (JP)

(72) Inventors: Chihiro Hiraiwa, Hyogo (JP); Masatoshi Majima, Hyogo (JP); Hiromasa Tawarayama, Hyogo (JP); Naho Mizuhara, Hyogo (JP); Takahiro Higashino, Hyogo (JP); Yohei Noda, Hyogo (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 103 days.

(21) Appl. No.: 15/309,242

(22) PCT Filed: May 15, 2015

(86) PCT No.: PCT/JP2015/063968
§ 371 (c)(1),
(2) Date: Nov. 7, 2016

(87) PCT Pub. No.: WO2015/182404
PCT Pub. Date: Dec. 3, 2015

(65) Prior Publication Data
US 2017/0077526 A1 Mar. 16, 2017

(30) Foreign Application Priority Data
May 26, 2014 (JP) ................................. 2014-107982

(51) Int. Cl.
*H01M 8/02* (2016.01)
*H01M 8/00* (2016.01)
(Continued)

(52) U.S. Cl.
CPC ........ *H01M 8/0245* (2013.01); *B01D 53/326* (2013.01); *B01D 53/92* (2013.01);
(Continued)

(58) Field of Classification Search
CPC . H01M 8/00; H01M 8/02; H01M 8/12; B01D 53/94
See application file for complete search history.

(56) References Cited

U.S. PATENT DOCUMENTS

2013/0108947 A1* 5/2013 Okuno .................... H01M 4/86
429/522

FOREIGN PATENT DOCUMENTS

| JP | H11-154523 A | 6/1999 |
| JP | 2000-243412 A | 9/2000 |

(Continued)

OTHER PUBLICATIONS

Machine Translation of JP 11-154523 A (Apr. 16, 2018) (Year: 2018).*

(Continued)

*Primary Examiner* — Matthew J Merkling
(74) *Attorney, Agent, or Firm* — Drinker Biddle & Reath LLP (57) ABSTRACT

A gas decomposition device 100 includes one or two or more membrane electrode assemblies 5, each including a solid electrolyte layer 2, an anode layer 3 stacked on a first side of the solid electrolyte layer 2, and a cathode layer 4 stacked on a second side of the solid electrolyte layer; and porous current collectors 8a, 8b, and 8c including continuous pores 1b, the membrane electrode assemblies being stacked with the porous current collector, the solid electrolyte layer being composed of a proton-conducting solid electrolyte, the porous current collectors including porous metal bodies 1, each of the porous metal bodies 1 including an alloy layer (Continued)

12a having corrosion resistance on at least a surface of the porous metal body 1 facing the continuous pores, and the porous metal bodies forming gas channels 9a, 9b, and 9c that supply gases to the anode layer and the cathode layer.

11 Claims, 5 Drawing Sheets

(51) Int. Cl.
```
    B01D 53/94      (2006.01)
    H01M 8/12       (2016.01)
    B01D 53/92      (2006.01)
    H01M 8/0245     (2016.01)
    H01M 8/0232     (2016.01)
    B01D 53/32      (2006.01)
```
(52) U.S. Cl.
CPC .............. *B01D 53/94* (2013.01); *H01M 8/00* (2013.01); *H01M 8/02* (2013.01); *H01M 8/0232* (2013.01); *H01M 8/12* (2013.01); *B01D 2257/406* (2013.01); *B01D 2257/7025* (2013.01)

(56) References Cited

FOREIGN PATENT DOCUMENTS

| | | |
|---|---|---|
| JP | 2006-012546 A | 1/2006 |
| JP | 2010-180789 A | 8/2010 |
| JP | 2011-096468 A | 5/2011 |
| JP | 2013-093271 A | 5/2013 |

OTHER PUBLICATIONS

Machine Translation of JP 2006-012546 A (Apr. 16, 2018) (Year: 2018).*

Machine Translation of JP 2010-180789 A (Apr. 16, 2018) (Year: 2018).*

Machine Translation of JP 2011-096468 A (Apr. 16, 2018) (Year: 2018).*

\* cited by examiner

GAS DECOMPOSITION DEVICE AND POWER GENERATION DEVICE

TECHNICAL FIELD

The present invention relates to a gas decomposition device and a power generation device, and in particular, to a gas decomposition device including a solid electrolyte and providing high gas decomposition efficiency even when the gas decomposition device is operated at a low temperature.

BACKGROUND ART

For example, exhaust gases and ammonia gas coming from automobiles are harmful to human bodies. Atmospheric release of such gases as they are causes pollution problems. Thus, various gas decomposition devices have been developed in order to decompose these gases.

For example, a gas decomposition device for decomposing a gas by the application of thermal energy in the presence of a catalyst, for example, platinum (Pt) or rhodium (Rh), has been known. The catalyst, however, is very expensive. It is thus difficult to use the catalyst for a gas decomposition device for treating exhaust gases from automobiles and so forth.

A gas decomposition device may be provided on the basis of the principle of a solid oxide fuel cell (hereinafter, referred to as a "SOFC"). The gas decomposition device based on the principle of the solid oxide fuel cell includes a membrane electrode assembly in which a solid electrolyte layer, an anode layer, and a cathode layer are integrally stacked. The gas decomposition device electrochemically decomposes gases by the conduction of ions to the solid electrolyte layer.

CITATION LIST

Patent Literature

PTL 1: Japanese Unexamined Patent Application Publication No. 2000-243412

SUMMARY OF INVENTION

Technical Problem

In the case where a gas decomposition device is provided on the basis of the principle of a fuel cell, it is difficult to allow exhaust gases and so forth and air (oxygen) to act separately on electrodes, unlike common fuel cells. It is thus necessary to provide what is called a single-chamber gas decomposition device in which a gas mixture containing exhaust gases and so forth and air (oxygen) flows in a container containing the membrane electrode assembly to allow the gas mixture to act on the anode layer and the cathode layer.

To efficiently decompose gases in the single-chamber gas decomposition device, however, a high temperature of 800° C. or higher needs to be applied. For example, when exhaust gases from automobiles are decomposed, heat generated by engines can be used. However, gas decomposition devices compete with other catalytic devices, thermoelectric conversion devices, and so forth for heat. Thus, places of installation of gas decomposition devices are limited, leading to a low degree of flexibility of design.

To increase the efficiency of engines, there has recently been a demand for a reduction in the temperature of exhaust gases from engines. Thus, it is becoming difficult to allow sufficient thermal energy to a gas decomposition device. To avoid the foregoing disadvantages, it is conceivable that scandia-stabilized zirconia (SSZ) and lanthanum gallate (LSGM), which operate as solid electrolytes at a relatively low temperature, are used.

However, SSZ and LSGM are ionic conductors; hence, water is formed on the side of an anode layer. The anode layer usually serves as a base component used for the formation of the solid electrolyte layer and has large thickness in order to achieve sufficient mechanical strength of a membrane electrode assembly. Thus, when the membrane electrode assembly for the treatment of exhaust gases is composed of any of these materials, it is difficult to drain water formed in the anode layer, thereby disadvantageously reducing gas decomposition performance.

The present invention has been conceived in order to solve the foregoing problems. It is an object of the present invention to provide a gas decomposition device capable of efficiently decomposing a gas at a low temperature and smoothly draining water formed.

Solution to Problem

A gas decomposition device according to an aspect of the present invention includes one or two or more membrane electrode assemblies, each including a solid electrolyte layer, an anode layer stacked on a first side of the solid electrolyte layer, and a cathode layer stacked on a second side of the solid electrolyte layer; and a porous current collector including continuous pores, the membrane electrode assemblies being stacked with the porous current collector, the solid electrolyte layer being composed of a proton-conducting solid electrolyte, the porous current collector including a porous metal body that includes an alloy layer having corrosion resistance on at least a surface of the porous metal body facing the continuous pores, and the porous metal body forming a gas channel that supplies a gas to the anode layer and the cathode layer.

Advantageous Effects of Invention

It is possible to efficiently decompose a gas at a low temperature and smoothly drain water formed.

DESCRIPTION OF EMBODIMENTS

Outline of Embodiments of the Present Invention

A gas decomposition device according to an aspect of the present invention includes one or two or more membrane electrode assemblies, each including a solid electrolyte layer, an anode layer stacked on a first side of the solid electrolyte layer, and a cathode layer stacked on a second side of the solid electrolyte layer; and a porous current collector including continuous pores, the membrane electrode assemblies being stacked with the porous current collector, the solid electrolyte layer being composed of a proton-conducting solid electrolyte, the porous current collector including a porous metal body that includes an alloy layer having corrosion resistance on at least a surface of the porous metal body facing the continuous pores, and the porous metal body forming a gas channel that supplies a gas to the anode layer and the cathode layer.

In the gas decomposition device according to this embodiment, the solid electrolyte layer is composed of a proton-conducting solid electrolyte. Examples of the solid electrolyte that may be used include yttrium-doped barium cerate (BCY), yttrium-doped barium zirconate (BZY), and yttrium-doped barium cerate zirconate (BZCY), which have proton conductivity.

The use of the proton-conducting solid electrolyte enables the operating temperature to be set to a lower temperature than that in the case of using an oxygen-ion-conducting solid electrolyte, such as YSZ, thus leading to less competition with other catalytic devices, thermoelectric conversion devices, and so forth for heat. Furthermore, a lower operating temperature results in a higher degree of flexibility of system design.

The use of the proton-conducting solid electrolyte also enables water to be formed on the cathode side. The cathode layer can have smaller thickness than the anode layer, so that water formed can be smoothly drained from the neighborhood of the cathode layer. Thus, there is no reduction in gas decomposition efficiency due to the inhibition of the diffusibility and flowability of a gas by water accumulated in the electrode.

The neighborhoods of the membrane electrode assemblies of the gas decomposition device are in a highly corrosive environment. In this embodiment, the porous metal body that includes an alloy layer having corrosion resistance on at least a surface of the porous metal body facing the continuous pores is used as the porous current collector.

The arrangement of the alloy layer increases the corrosion resistance of the porous metal body to improve the durability of the gas decomposition device. The alloy layer may be arranged so as to have predetermined thickness and cover a surface of the porous metal body. The porous metal body may be composed entirely of an alloy having corrosion resistance.

The alloy having corrosion resistance may be selected from alloys having various compositions. For example, a nickel (Ni)-tin (Sn) alloy, a nickel (Ni)-chromium (Cr) alloy, or the like may be used.

A porous nickel (Ni) body including an alloy layer containing tin (Sn) on at least a surface of the porous nickel (Ni) body facing the continuous pores is preferably used as the porous metal body including the alloy layer having corrosion resistance.

Nickel (Ni) is inexpensive. The arrangement of the alloy layer containing tin (Sn) on the surface achieves required corrosion resistance.

The alloy layer containing tin is arranged on at least the surface of the porous nickel body facing the continuous pores. The porous nickel body may be composed entirely of a tin alloy. The tin alloy layer having predetermined thickness may be arranged on the surface of the porous nickel body.

The whole of the porous nickel body and the alloy layer containing tin may contain an alloy component other than tin. To improve corrosion resistance, for example, an alloy layer containing chromium (Cr), W (tungsten), cobalt (Co), copper (Cu), iron (Fe), manganese (Mn), or the like may be arranged.

Different corrosive environments are present in different portions of the gas decomposition device. In this embodiment, water is formed in the cathode layer; hence, the neighborhood of the cathode layer is in a severe corrosive environment, compared with the neighborhood of the anode layer. Thus, a portion of the porous metal body adjacent to the cathode layer stacked on the porous metal body preferably has a higher tin content than a portion of the porous metal body adjacent to the anode layer stacked on the porous metal body.

For example, a portion of the porous metal body in the neighborhood of the cathode (when the thickness of the porous metal body is defined as 1, the portion of the porous metal body extending from a position adjoining the cathode layer to a position ⅓ from the position adjoining the cathode layer) has a tin content of 10% to 20% by mass. The other portion of the porous metal body has a lower tin content than the portion of the porous metal body in the neighborhood of the cathode. This results in a low tin content of the porous metal body as a whole while the corrosion of the portion of the porous metal body in the neighborhood of the cathode is inhibited.

The porous metal body according to this embodiment forms a gas channel that supplies a gas to the anode layer and the cathode layer.

To allow the porous metal body to function as the gas channel, the porous metal body preferably has a porosity of 30% to 98%. A porosity less than 30% results in a reduction in the flowability of the gas. A porosity more than 98% does not result in the porous metal body having sufficient strength.

To allow the porous metal body to function as the gas channel, furthermore, the pore size is preferably 0.1 mm or more and 1 mm or less. A pore size less than 0.1 mm results in an increase in the flow resistance of the gas. A pore size more than 1 mm results in a reduction in the diffusion function of the gas, thereby failing to allow a gas to act uniformly on the electrode layers.

A portion of the porous metal body adjacent to the cathode layer stacked on the porous metal body preferably has higher porosity and larger pore size than a portion of the porous metal body adjacent to the anode layer stacked on the porous metal body. This results in smooth drainage of water formed on the side of the cathode. In addition, water formed is less likely to accumulate in the cathode layer and a portion of the porous metal body in the neighborhood of the cathode layer.

A technique for forming a porous metal body having different porosities and pore sizes is not particularly limited. For example, a porous metal body having different porosities and pore sizes may be formed by a combination of two or more porous metal bodies having different porosities and pore sizes. Different porosities and pore sizes may be formed in an porous metal body integrally formed by compression deformation of a porous metal body having uniform pore size and porosity.

To increase the gas decomposition efficiency, a flowing gas is preferably allowed to act uniformly on the electrode layers. A gas inflow side of the porous metal body may have a smaller pore size than the other portion of the porous metal body. For example, the pore size of the porous metal body as a whole is preferably 0.1 mm or more and 1 mm or less, and the pore size on the gas inflow side is preferably smaller than the pore size of the other portion within the above range. This structure allows a gas to flow in the porous metal body in a turbulent state to act on the electrodes smoothly and uniformly, thereby decomposing the gas.

The structure of the porous metal body is not particularly limited. For example, a fibrous metal may be knitted or entangled to form a porous metal body.

The porous metal body preferably includes a skeleton that includes a shell portion and a core portion, the core portion containing one or both of a hollow portion and a conductive material, and the skeleton having a three-dimensional mesh-like structure having an integrated continuous form. The porous metal body having the three-dimensional mesh-like structure can have high porosity and pores with uniform pore size. This results in the low flow resistance of a gas, thereby increasing the efficiency of the gas decomposition device.

A technique for the production of the porous metal body having the foregoing structure is not particularly limited. For example, the technique for the production may include a nickel porous base formation step of forming a porous base composed of nickel, a tin coating step of coating the nickel porous base with tin, and a tin alloying step of alloying the deposited tin with the nickel porous base.

The gas decomposition device according to this embodiment uses the principle of a fuel cell. Thus, electricity is generated at the time of the decomposition of a gas. The generated electricity may be stored in a battery or may be used for the operation of another device.

Details of Embodiments

Embodiments will be specifically described below with reference to the drawings.

Figure 1:
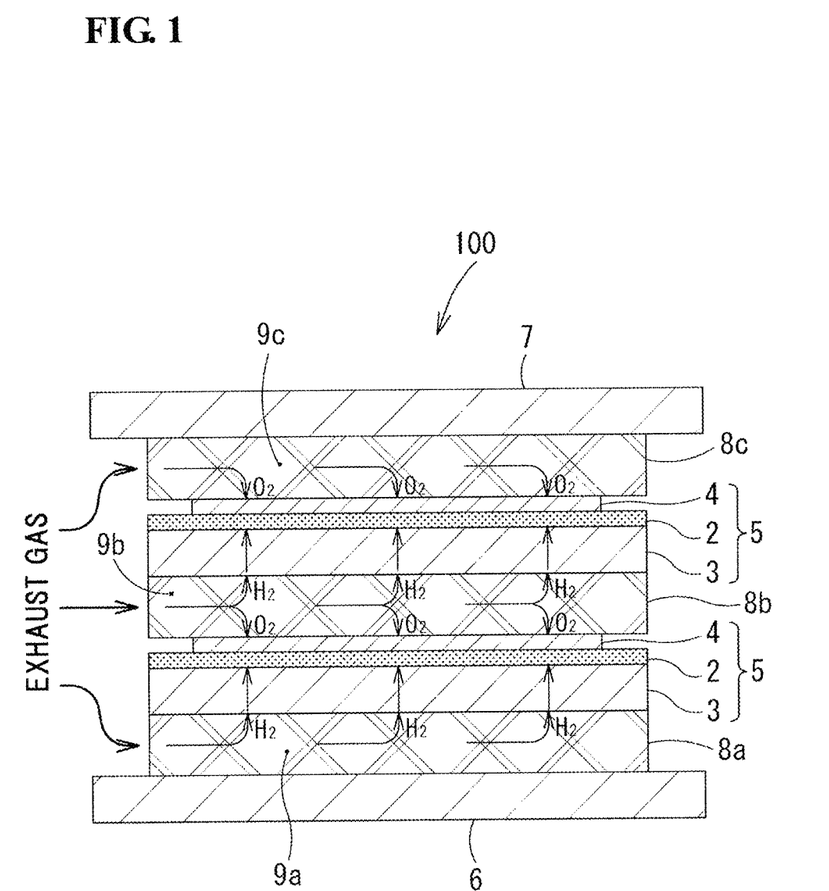
FIG. 1 is a cross-sectional view illustrating a schematic structure of a gas decomposition device according to an embodiment.

FIG. 1 illustrates a cross-sectional structure of a main portion of a gas decomposition device according to an embodiment. A gas decomposition device 100 according to the embodiment includes two membrane electrode assemblies 5 and 5. Each of the membrane electrode assemblies 5 and 5 includes a solid electrolyte layer 2, an anode layer 3 stacked on one side of the solid electrolyte layer 2, and a cathode layer 4 stacked on the other side.

The membrane electrode assemblies 5 and 5 are stacked with porous current collectors 8a, 8b, and 8c, and held by electrically-conductive flat-shaped current-collecting members 6 and 7 so as to be interposed therebetween.

In fact, the entire gas decomposition device 100 is contained in a container. As illustrated in FIG. 1, an exhaust gas is supplied from a side. The porous current collectors 8a, 8b, and 8c form gas channels 9a, 9b, and 9c, respectively, and are configured in such a manner that a gas acts on the electrode layers 3 and 4 of each of the membrane electrode assemblies 5 and 5 with the gas flowing in the porous current collectors 8a, 8b, and 8c toward the planar direction of the solid electrolyte layer 2.

In this embodiment, the porous current collectors 8a, 8b, and 8c also function as conductive members that electrically connect the anode layer 3 and the cathode layer 4, facing each other, of adjacent membrane electrode assemblies 5 and 5. In this structure, the plural membrane electrode assemblies 5 and 5 are connected in series to achieve a high voltage.

As a solid electrolyte contained in the solid electrolyte layer 2, for example, yttrium-doped barium cerate (BCY), yttrium-doped barium zirconate (BZY), and yttrium-doped barium cerate zirconate (BZCY), which have proton conductivity, may be used. The solid electrolyte layer 2 has a thickness of about 50 μm.

As a material for the anode layer 3, a material in which the solid electrolyte is doped with nickel (Ni) may be used. From the viewpoint of achieving a certain level of strength of a structure that supports the solid electrolyte, the anode layer preferably has a 100 μm or more and 1000 μm or less.

As a material for the cathode layer 4, a lanthanum-strontium-iron-cobalt-based material (LSCF), a barium-strontium-iron-cobalt-based material (BSCF), or the like may be used. The anode layer 3 has a thickness of 500 to 1000 μm.

Figure 2:
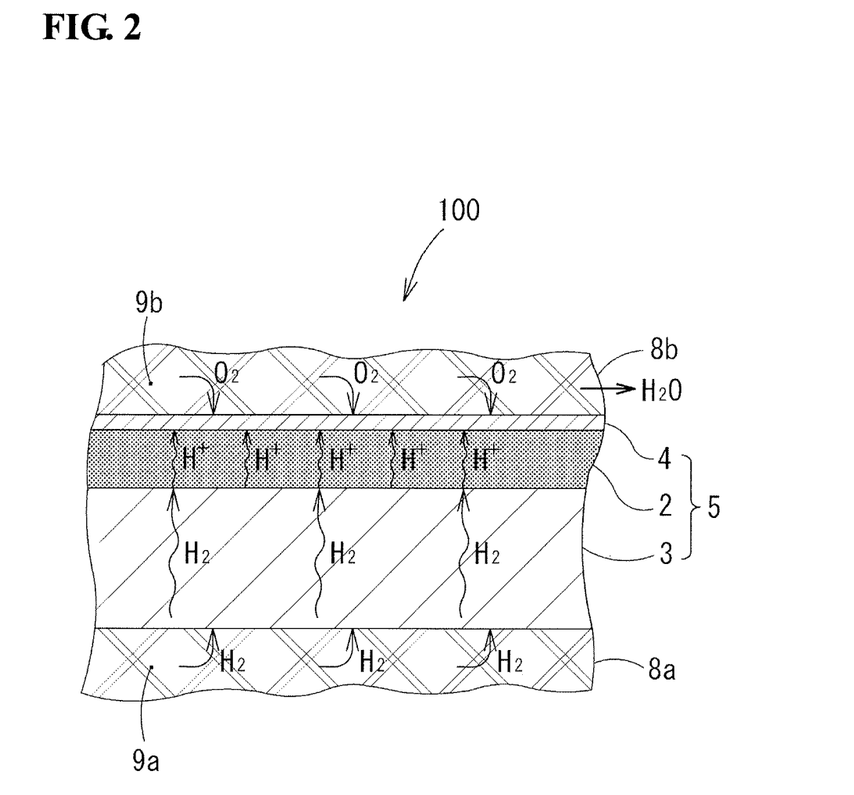
FIG. 2 is a cross-sectional view illustrating the operating principle of a gas decomposition device.

As illustrated in FIG. 2, in the case where the proton-conducting solid electrolyte layer 2 is used, for example, ammonia gas and methane gas are decomposed in the neighborhood of the anode layer 3 and in the porous current collector 8a to form hydrogen gas and protons $H^+$. The protons $H^+$ are moved to the cathode layer 4 through the solid electrolyte layer 2. The protons $H^+$ react with oxygen $O_2$ in the cathode layer 4 to form water ($H_2O$). The protons $H^+$ are smaller than oxygen ions and thus have a high transfer rate, so that sufficient gas decomposition performance is achieved even at a low heating temperature.

The cathode layer 4 has small thickness, so water formed is rapidly drained from the cathode layer 4. Thus, there is no accumulation of water in the form of a droplet in the cathode layer 4, and there is no degradation in the performance of the gas decomposition device 100. In this embodiment, the gas is decomposed with the gas decomposition device heated to 400° C. to 600° C. by a heat source, such as an engine. From the viewpoint of minimizing the thickness while functions as a cathode layer (air electrode) are fulfilled, the cathode layer preferably has a thickness of 10 μm or more and 100 μm or less. In this embodiment, the cathode layer 4 has a thickness of about 50 μm.

Each of the porous current collectors 8a, 8b, and 8c is formed of a porous metal body 1 including an alloy layer 12a having corrosion resistance. Various structures may be used for the porous metal body. For example, a sheet-like porous metal body formed by knitting or entangling metal fibers may be used.

In this embodiment, the porous metal body 1 including the alloy layer 12a composed of a nickel (Ni)-tin (Sn) alloy is used for each of the porous current collectors 8a, 8b, and 8c.

Figure 3:
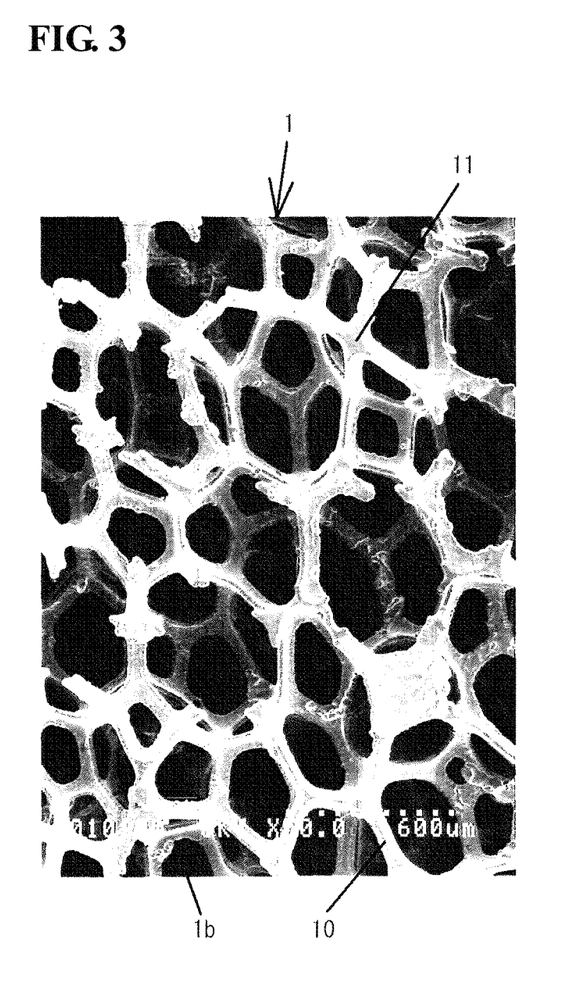
FIG. 3 is a photomicrograph illustrating an example of a porous metal body.
Figure 4:
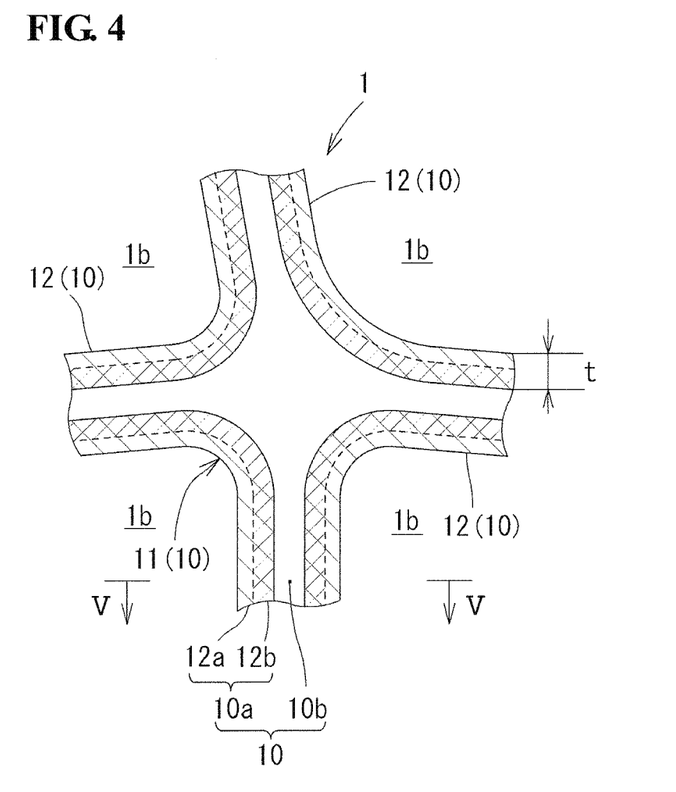
FIG. 4 is a schematic cross-sectional view illustrating the structure of the porous metal body illustrated in FIG. 3.
Figure 5:
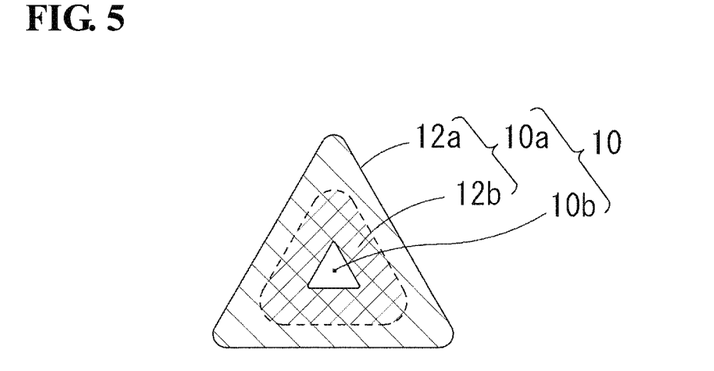
FIG. 5 is a schematic cross-sectional view taken along line V-V of FIG. 4.

FIG. 3 is an electron micrograph illustrating the external structure of the porous metal body 1 contained in each of the porous current collectors 8a, 8b, and 8c. The porous metal body 1 has a three-dimensional mesh-like structure including continuous pores 1b. As illustrated in FIGS. 4 and 5, the three-dimensional mesh-like structure has a structure in which a triangular-prism-like skeleton 10 extends continuously and three-dimensionally. A plurality of branch portions 12 included in the skeleton 10 are united at nodal portions 11 to provide an integrated continuous form. As illustrated in FIG. 4, the skeleton 10 includes a shell portion 10a and a hollow core portion 10b. As described below, the alloy layer 12a composed of a nickel (Ni)-tin (Sn) alloy in which nickel (Ni) and tin (Sn) are integrally alloyed together is arranged on the surface of the shell portion 10a.

The porous metal body 1 has a porous structure including the continuous pores 1b. Thus, a gas and so forth are allowed to flow in the continuous pores 1b to act on the electrodes. In addition, current collection is efficiently performed. Furthermore, the porous metal body 1 has a three-dimensional mesh-like structure and thus has very high porosity. This results in low flow resistance of the gas in the pores and can allow a large amount of the gas to flow, thereby increasing the gas decomposition efficiency.

As illustrated in FIG. 4, the shell portion 10a has substantially constant thickness t in the nodal portions 11 and the branch portions 12 united thereat in the three-dimensional mesh-like structure. Thus, the porous body has uniform mechanical strength as a whole. Even if the porous body is used for a current collector of a SOFC used in a high temperature environment, required strength is provided.

For example, the porous metal body 1 preferably has a porosity of 30% to 98%. Furthermore, after the porous metal body 1 is heated to 600° C. or higher in air, when a load of 30 Kgf/cm$^2$ is applied to the porous metal body 1 at ordinary temperature, the amount of change in the thickness of the porous metal body 1 is preferably less than 30%.

The porous metal body 1 includes the alloy layer 12a composed of an alloy containing Ni (nickel) and Sn (tin) (hereinafter, referred to as a "Ni—Sn alloy"). The contents of Ni and Sn of the alloy layer 12a may be set, depending on the operating temperature and so forth. For example, the alloy layer 12a preferably contains 10% to 20% by mass of Sn and more preferably 12% to 17% by mass of Sn. In addition to the Ni component and the Sn component, 10% by mass or less of a phosphorus component is preferably added. In the case of adding the phosphorus component, a phosphorus-containing additive may be added in forming the Ni—Sn alloy layer. For example, after a Ni layer is formed by electroless nickel plating, a hypophosphorous-acid-based material is used as a reductant. Thereby, the phosphorus component is added. In this case, electrolytic resistance and the corrosion resistance are further improved. A higher phosphorus content results in lower thermal resistance. Thus, the phosphorus content is set to 10% or less.

The porous metal body 1 may be formed by any of a variety of methods. For example, the surface of the porous base is directly coated with a Ni—Sn alloy material to be contained in the porous metal body, and then the resulting article is fired to form the Ni—Sn alloy layer.

The porous metal body 1 may be formed by a process including a step of subjecting a three-dimensional-mesh-like resin porous base to electrical conduction treatment to form a surface conductive layer; a Ni-coating-layer formation step of forming a Ni-coating layer on the conductive layer; a Sn-coating-layer formation step of forming a Sn-coating layer on the Ni-coating layer; a base elimination step of eliminating the resin porous base in an atmosphere containing at least oxygen; and a diffusion step of diffusing and alloying the Ni-coating layer and the Sn-coating layer at 300° C. to 1100° C. in a reducing atmosphere. Alternatively, the following process may be performed: After the Ni-coating-layer formation step is performed, the base elimination step is performed. A step of reducing the Ni-coating layer that has been oxidized in the base elimination step, and then the Sn-coating-layer formation step and the diffusion step are performed.

Regarding the form of the three-dimensional-mesh-like resin, a resin foam, a nonwoven fabric, a felt, or a woven fabric may be used. A material used for the three-dimensional-mesh-like resin is not particularly limited. A material that can be eliminated by heating or the like after being coated with a metal is preferably used. To achieve good processability and handleability, a flexible material is preferably used. In particular, a resin foam is preferably used as the three-dimensional-mesh-like resin. Any of known resin foams may be used as long as it has a porous form including continuous pores. Examples of the resin foam that may be used include urethane resin foams and styrene resin foams.

The form of pores, porosity, dimensions, and so forth of the resin foam are not particularly limited and may be appropriately set, depending on applications.

In the case of forming the porous metal body 1 by plating treatment, the step of forming a surface conductive layer is performed to reliably form the Ni-coating layer on a surface facing each pore of the three-dimensional mesh-like resin. A formation method is not particularly limited as long as the surface conductive layer required for Ni-coating treatment is formed. For example, in order to form a surface conductive layer composed of Ni, electroless plating treatment, sputtering treatment, or the like may be employed.

Methods for forming the Ni-coating layer 12b and the Sn-coating layer are not particularly limited. A known plating method, such as an aqueous solution-based plating method, may be employed.

The overall thickness (coating weight) of the Ni—Sn alloy-coating layer is not particularly limited. The coating weight may be set in consideration of required porosity and strength. The Ni—Sn alloy-coating layer may have a coating weight of, for example, 100 g/m$^2$ to 2000 g/m$^2$.

The thickness of each of the Ni-coating layer 12b and the Sn-coating layer is set, depending on the Ni content and the Sn content. For example, when the ratio of the Ni content to the Sn content is 8:2, the ratio in thickness (coating weight) of the Ni-coating layer 12b to the Sn-coating layer may be 800 g/m$^2$ (Ni):200 g/m$^2$ (Sn).

After the formation of the Ni-coating layer 12b and the Sn-coating layer or after the formation of the Ni-coating layer 12b, the base elimination step of eliminating the three-dimensional mesh-like resin is performed. In the base elimination step, for example, the porous body including the coating layer(s) is heat-treated in a stainless-steel muffle at a predetermined temperature in a reducing atmosphere, such as air, to eliminate the three-dimensional mesh-like resin through incineration.

As illustrated in FIGS. 4 and 5, while the core portion 10b of the porous metal body 1 according to this embodiment is hollow, the core portion 10b is not limited thereto. In the foregoing embodiment, the surface conductive layer (not illustrated) composed of Ni and the Ni-coating layer 12b and the Sn-coating layer that are stacked on the surface conductive layer interdiffuse into the unitary alloy layer 12a. In the case where the surface conductive layer is composed of another conductive material, the surface conductive layer can remain as a core portion.

The porous body including the Sn-coating layer and the Ni-coating layer stacked is heat-treated in a stainless-steel muffle at 300° C. to 1100° C. in a reducing gas atmosphere, for example, CO or H$_2$ to allow the Ni-coating layer 12b and the Sn-coating layer to interdiffuse, thereby forming the shell portion 10a including the Ni—Sn alloy layer 12a. Regarding a thickness of the alloy layer 12a, 5 μm or more is preferred.

The use of the foregoing steps enables the formation of the porous metal body 1 exhibiting only small variations in Sn concentration in the shell portion 10a and having high oxidation resistance at a high temperature. The shell portion is formed of the coating layers, thus enabling the shell portion to have substantially uniform thickness (cross-sectional area) in the porous body. This leads to the porous body exhibiting only small variations in mechanical strength and the formation of the porous current collector having uniform strength. Thus, even if the porous current collector is used as a current collector of a gas decomposition device required to have thermal resistance and mechanical strength, good durability is achieved.

The thickness of each of the porous current collectors 8a, 8b, and 8c may be set, depending on the structure and so forth of the gas decomposition device. To achieve good gas diffusibility into the anode layer 3 and the cathode layer 4, each of the porous current collectors 8a, 8b, and 8c preferably has a thickness of 100 to 2000 m, more preferably 120 to 1500 µm, and still more preferably 300 to 1500 µm. An excessively small thickness of each of the porous current collectors 8a, 8b, and 8c results in lower gas diffusibility, failing to allow the gas to act uniformly on the electrode layers 3 and 4. An excessively large thickness results in a larger cell, thereby leading to the gas decomposition device having larger dimensions. In this embodiment, the porous current collectors 8a, 8b, and 8c are formed from the porous metal body 1 having a thickness of 1 mm.

To examine the durability and the mechanical strength of the porous metal body 1, the following test was performed. In this test, changes in mass upon oxidation and the tensile strength of a plurality of the porous metal bodies 1 having different tin contents were measured under predetermined conditions.

1. Test of Change in Mass Upon Oxidation

[Test Conditions]

Porous metal bodies composed of nickel-tin alloys having different tin concentrations were heated to 800° C. or 600° C. in air. After a lapse of 1000 hours and 3000 hours, the changes in mass upon oxidation were measured.

[Test Results]

Figure 6:
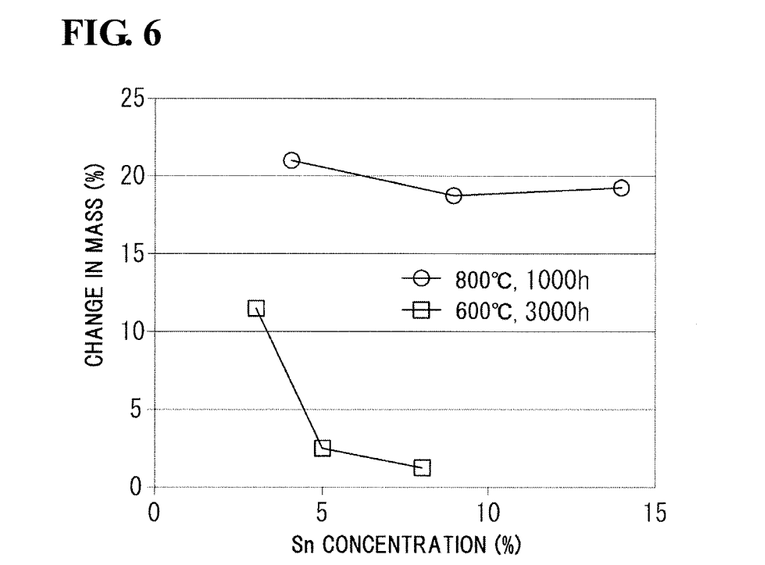
FIG. 6 is a graph depicting the results of an anticorrosion test of porous metal bodies having different tin contents.

As illustrated in FIG. 6, in the porous metal bodies having a tin concentration of 5% by mass or more, the smaller changes in mass were observed.

2. Tensile Strength Test

[Test Conditions]

The tensile strength and the elongation percentage of porous metal bodies composed of nickel-tin alloys having different tin concentrations were measured. The tensile test was performed as follows: In an air atmosphere at room temperature, each of the porous metal bodies composed of the nickel (Ni)-tin (Sn) alloys having various tin concentrations was placed on a tensile testing machine. The elongation percentage was measured by the application of a load.

[Test Results]

Figure 7:
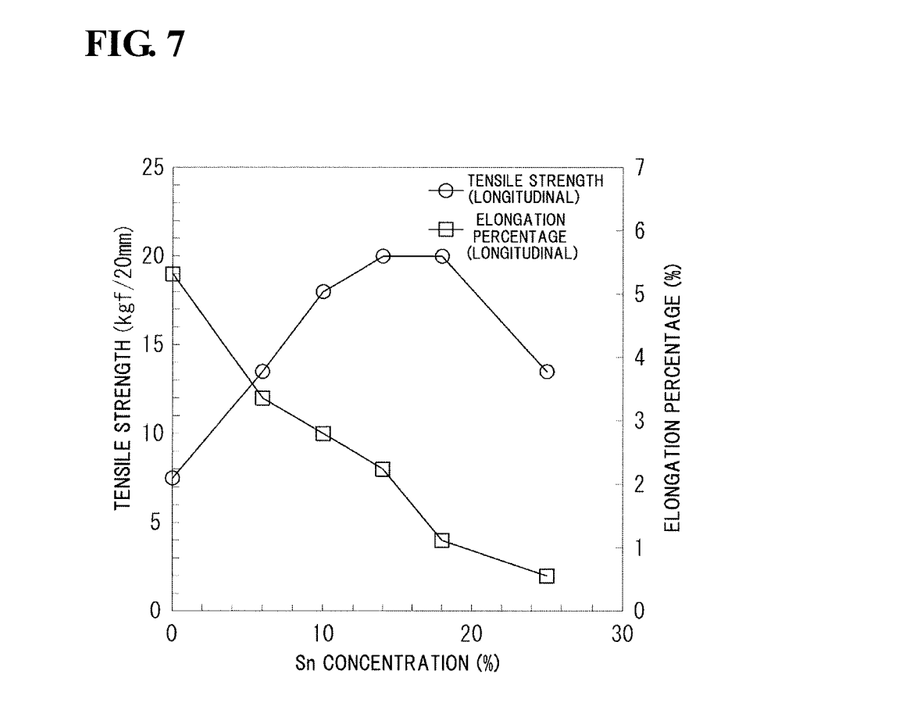
FIG. 7 is a graph depicting the results of a tensile strength test of porous metal bodies having different tin contents.

As illustrated in FIG. 7, an increase in tin concentration increases the tensile strength and reduces the elongation percentage.

From the results illustrated in FIGS. 6 and 7, a suitable tin concentration in the porous metal body composed of the nickel-tin alloy, the porous metal body serving as the current collector of the gas decomposition device, will be discussed. In the case where the gas decomposition device of the present invention is used for a mobile object, such as an automobile, it is preferred that the degradation of the current collector (porous metal body) due to oxidation be minimized at an operating temperature of the gas decomposition device. The temperature of the gas decomposition device of the present invention is markedly changed by turning on and off an engine. Thus, in order to enhance resistance to the heat cycle, it is necessary to achieve good balance between the tensile strength and the elongation percentage in a high level.

At low tensile strength, the skeleton of the porous metal body included in the current collector extends easily during the heat cycle and thus can be thinned or cut. At low elongation percentage, the skeleton of the porous metal body included in the current collector can be easily cut.

The thinning or cutting of the porous metal body included in the current collector can increase the electrical resistance, leading to a reduction in the gas decomposition efficiency.

FIG. 6 demonstrates that in view of thermal resistance at about 600° C., a tin concentration of 5% by mass or more is preferred. FIG. 7 demonstrates that a good balance between the tensile strength and the elongation percentage is achieved in the tin concentration range of 10% to 20% by mass.

In consideration of all the results, it was found that a nickel-tin alloy having a tin concentration of 10% to 20% by mass is preferred in order to serve as the current collector of the gas decomposition device. More preferably, the tin concentration may be in the range of 12% to 17%.

The scope of the present invention is not limited to the foregoing embodiments. It should be understood that the embodiments disclosed herein are only exemplary in all aspects and are not restrictive. The scope of the present invention is shown by the scope of the claims and not by the above description, and it is intended that meanings equivalent to the scope of the claims and all variations within the scope are included.

INDUSTRIAL APPLICABILITY

There is provided a gas decomposition device capable of decomposing a gas at a low temperature and smoothly draining water formed.

REFERENCE SIGNS LIST 1 porous metal body
1b continuous pore
2 solid electrolyte layer
3 anode layer
4 cathode layer
5 membrane electrode assembly
6 current-collecting member
7 current-collecting member
8a porous current collector
8b porous current collector
8c porous current collector
9a gas channel
9b gas channel
9c gas channel
10 skeleton
10a shell portion
10b core portion
11 nodal portion
12 branch portion
12a alloy layer
12b Ni-coating layer
100 gas decomposition device

The invention claimed is:

1. A gas decomposition device comprising:
    first and second membrane electrode assemblies, each including a solid electrolyte layer, an anode layer stacked on a first side of the solid electrolyte layer, and a cathode layer stacked on a second side of the solid electrolyte layer; and
    a porous current collector including continuous pores,
    the first and second membrane electrode assemblies being stacked with the porous current collector such that the porous current collector is interposed between the cathode layer of the first membrane electrode assembly and the anode layer of the second membrane electrode assembly, the solid electrolyte layer being composed of a proton-conducting solid electrolyte, the porous current collector including a porous metal body that includes an alloy layer having corrosion resistance on at least a surface of the porous metal body facing the continuous pores, a tin content in a portion of the porous metal body adjacent to the cathode layer of the first membrane electrode assembly being different than a tin content in a portion of the porous metal body adjacent to the anode layer of the second membrane electrode assembly, and the porous metal body forming a gas channel that supplies a gas to the anode layer of the second membrane electrode assembly and the cathode layer of the first membrane electrode assembly.

2. The gas decomposition device according to claim 1, wherein the alloy layer is composed of a nickel (Ni)-tin (Sn) alloy and has a tin content of 10% to 20% by mass.

3. The gas decomposition device according to claim 1, wherein the tin content in the portion of the porous metal body adjacent to the cathode layer of the first membrane electrode assembly is higher than the tin content in the portion of the porous metal body adjacent to the anode layer of the second membrane electrode assembly.

4. The gas decomposition device according to claim 1, wherein the porous metal body has a porosity of 30% to 98% and a pore size of 0.1 mm or more and 1 mm or less.

5. The gas decomposition device according to claim 1, wherein the portion of the porous metal body adjacent to the cathode layer of the first membrane electrode assembly has higher porosity than the portion of the porous metal body adjacent to the anode layer of the second membrane electrode assembly.

6. The gas decomposition device according to claim 1, wherein the portion of the porous metal body adjacent to the cathode layer of the first membrane electrode assembly larger pore size than the portion of the porous metal body adjacent to the anode layer of the second membrane electrode assembly.

7. The gas decomposition device according to claim 1, wherein a side of the porous metal body that receives a gas inflow has a smaller pore size than a side of the porous metal body that does not receive the gas inflow.

8. The gas decomposition device according to claim 1, wherein the porous metal body includes a skeleton that includes a shell portion and a core portion, the core portion containing one or both of a hollow portion and a conductive material, and wherein the skeleton has a three-dimensional mesh-like structure having an integrated continuous form.

9. The gas decomposition device according to claim 1, wherein the anode layer of each membrane electrode assembly has a thickness of 100 μm or more and 1000 or less.

10. The gas decomposition device according to claim 1, wherein the cathode layer of each membrane electrode assembly has a thickness of 10 μm or more and 100 μm or less.

11. A power generation device comprising the gas decomposition device according to claim 1.

* * * * *

UNITED STATES PATENT AND TRADEMARK OFFICE
CERTIFICATE OF CORRECTION

PATENT NO. : 10,109,866 B2  
APPLICATION NO. : 15/309242  
DATED : October 23, 2018  
INVENTOR(S) : Chihiro Hiraiwa et al.

Page 1 of 1

It is certified that error appears in the above-identified patent and that said Letters Patent is hereby corrected as shown below:

In the Claims

Column 12, Line 7, "assembly" should read --assembly has--

Signed and Sealed this  
Fifteenth Day of January, 2019

Andrei Iancu  
*Director of the United States Patent and Trademark Office*